Nov. 20, 1962  R. H. WHITE  3,065,034
ROLLER BEARING FOR KEY
Filed Jan. 27, 1961  2 Sheets-Sheet 1

ROBERT H. WHITE
*INVENTOR*

BY *Mason, Porter, Diller & Stewart*
ATTORNEYS

Nov. 20, 1962 R. H. WHITE 3,065,034
ROLLER BEARING FOR KEY
Filed Jan. 27, 1961 2 Sheets-Sheet 2
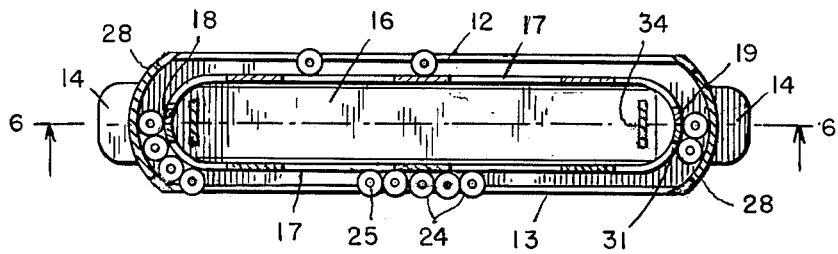
FIG. 5.
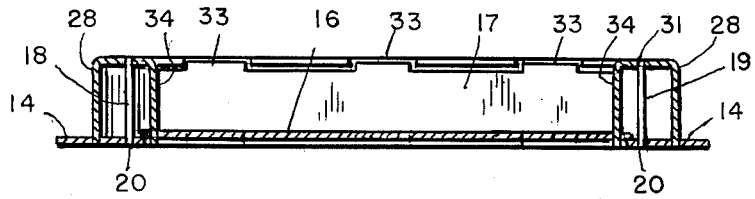
FIG. 6.
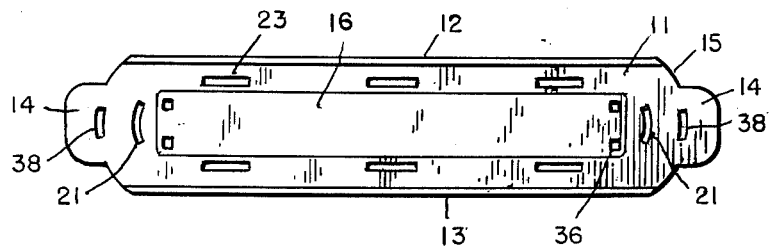
FIG. 7.
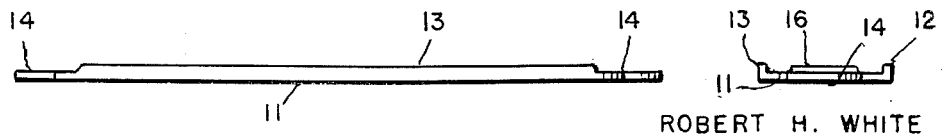
FIG. 8.
FIG. 9.
ROBERT H. WHITE
INVENTOR
BY *Mason, Porter, Miller & Stewart*
ATTORNEYS

United States Patent Office 3,065,034
Patented Nov. 20, 1962

3,065,034
ROLLER BEARING FOR KEY
Robert H. White, Torrington, Conn., assignor to The Torrington Company, Torrington, Conn., a corporation of Maine
Filed Jan. 27, 1961, Ser. No. 85,270
8 Claims. (Cl. 308—6)

The following specification relates to a roller bearing for a key adapted for providing an anti-friction bearing between two machine parts which are relatively reciprocated.

A typical instance of the utility of such a bearing is in the contact between an outer bearing member such as a collar, joint or sleeve and an inner shaft adapted to be rotated with the collar, joint or sleeve, but at the same time capable of reciprocating axial movement relative to the aforesaid member. Another type of application is where one part is fed or reciprocated in contact with a housing.

In the former instance the inner member such as a shaft has a longitudinal grooved keyway. The outer member carries a key adapted to be received within the keyway. To reduce friction contact between the key and keyway, an anti-friction bearing is interposed between the two. Such a bearing forms the subject of this invention by providing bearing members such as small rollers capable of travelling longitudinally with the reciprocating shaft. Such rollers at the end of their movement are supported from the wall of the keyway and brought back into contact by reverse reciprocation. In some instances they may be directed back to the opposite end of the effective side of the bearing for further rolling contact.

One of the objects of the invention is to design this reciprocating bearing by making it of simple parts. Thus the individual parts may be previously hardened or heat treated to avoid later heat treating which would be superficial or possibly detrimental to the rollers and other parts after assembly.

A further object of the invention is to design the individual parts so that they may be made readily from stamped metal of durable properties.

Another object of the invention is to provide novel means for rigidly holding together the several parts of the bearing after assembly.

Among the objects of my invention is to simplify the usual construction of such recirculating reciprocating bearings by providing interfitting parts which coact with each other to improve the rigidity and durability of the bearing as a whole.

Figure 1:
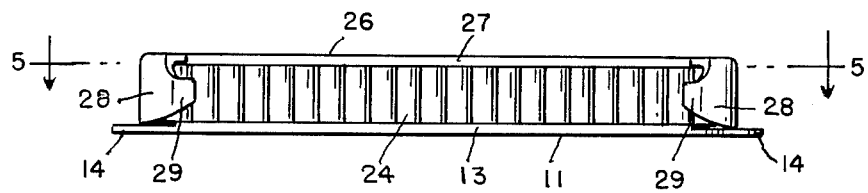
Figure 2:
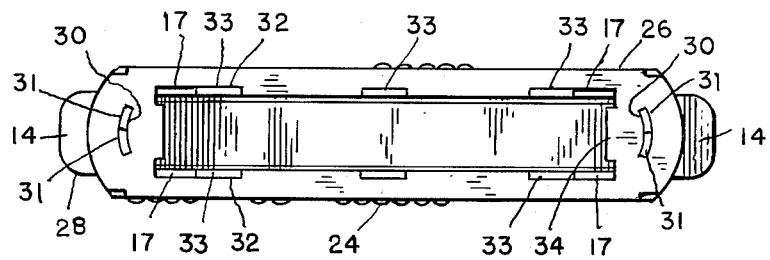
Figure 3:
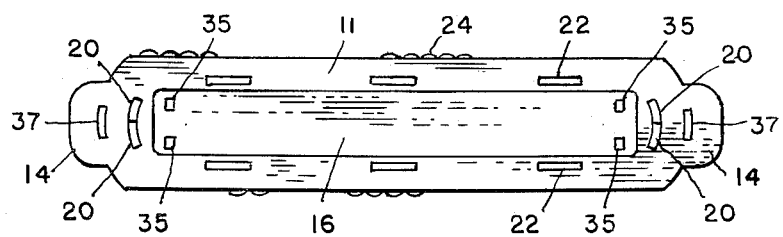
Figure 4:
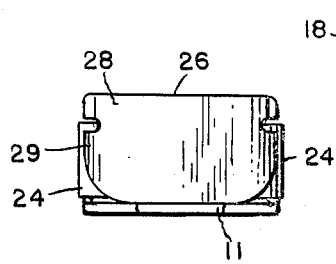
Figure 10:
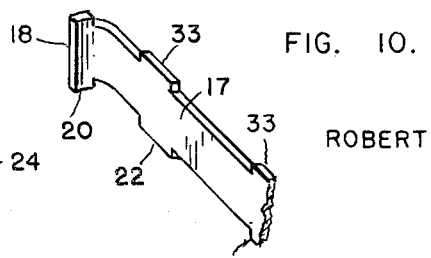

Other objects of the invention will be apparent from the following description of the preferred form of the invention as illustrated in the accompanying drawings in which:

FIG. 1 is a side elevation of the improved spline roller bearing;
FIG. 2 is a top plan view;
FIG. 3 is a bottom view;
FIG. 4 is an end elevation of the same;
FIG. 5 is a horizontal section on the line 5—5 of FIG. 1;
FIG. 6 is a vertical longitudinal section on the line 6—6 of FIG. 5;
FIG. 7 is a top plan view of the bottom plate;
FIG. 8 is a side elevation of the bottom plate;
FIG. 9 is an end elevation of the bottom plate and
FIG. 10 is a fragmentary perspective view of the inner race.

Briefly described, the invention consists in providing a recirculating reciprocating bearing from parts which are simple in design, readily interfitted and of increased durability or serviceable life.

To this purpose, the bearing is formed from a base plate, a cover plate and interposed inner raceways which hold a series of miniature rollers in exposed operating positions, the sum of the parts being rigidly held together.

As shown on the drawings, I provide a base or lower plate 11 which is relatively long and narrow. This is formed of sheet metal which after shaping is capable of being hardened by heat treating or the like.

The base 11 has opposite parallel upstanding side flanges 12 and 13. Each end of the plate 11 terminates in an ear 14, 14. The base 11 is curved at the corners 15 in the area between the flanges 12 and 13 on one hand and the ears 14.

Centrally the base 11 is embossed as shown in FIG. 7 to provide an upwardly extending crown or land 16. The area between the crown 16 and each flange 12 and 13 provides space for an inner race and a series of miniature rollers 24.

The inner race is formed of two identical parts 17. These are of sheet metal, having the ends 18 and 19 curved for 90 degrees. One part 17 is fitted around each side of the crown 16 with the ends 18 and 19 abutting.

Each end has a depending tongue 20, 20. These depending tongues 20 fit into a curved slot 21, 21 at opposite ends of the base 11. The lower side edge of the race 17 is indented as shown in FIG. 6 to provide spaced tongues 22, 22. The base 11 is slotted longitudinally adjacent the sides of the crown 16 to provide slots 23, adapted to receive the tongues 22, 22.

The rollers are reduced at opposite ends to provide small trunnions or pivots 25. The lower pivot 25 rests on the upper face of the base 11 while the periphery of the rollers is in contact with the outer face of a race member 17. In this position the roller is wide enough to extend beyond the side flange 12 or 13. The series of rollers is thus projected beyond side flanges 12 and 13 to provide rolling contact with an adjoining machine part.

Sufficient rollers are provided to completely occupy the space surrounding the inner races 17, 17, but loose enough to permit rolling contact thereon.

The means provided for holding the above parts in operating relationship and positions consists of a cap 26. This cap is in the form of a thin, hard metallic plate. It has the same general form as the base 11 which it overlies. The cap 26 has corresponding depending flanges 27, 27 along its side edges. The ends of the cap 26 are bent down to form perpendicular retaining ends 28, 28. These ends are concentric with the adjacent curved ends of the raceway parts 17, 17. Thus the ends retain the rollers as they successively leave the side tracks between the inner race and the lower side flanges 12 and 13 and the upper side flanges 27, 27. The wings 29, 29 on the ends 28, 28 of the cap are bent around the rollers but do not extend outwardly beyond the outer edges of the flanges 12, 13 and 27. This is accomplished by grinding off or tapering the ends 29, thus leaving the rollers exposed to the extent shown in FIG. 5.

The cap 26 has a curved slot 30 in each end overlying the inner race 17. The race portions have upwardly projecting tongues 31, 31 which fit within each slot 30 to hold the race portions rigidly in opposing relation.

The cap 26 has an open center. The inner longitudinal edges of the center are recessed as shown at 32, 32 to hold upper tongues 33 of the race 17.

The cap 26 also has depending tongues 34, 34 across or transversely of the open center. These tongues 34 have spaced tangs 35, 35. The tangs 35, 35 fit within openings 36, 36 in the base. These tangs are then staked to hold the cap 26 and the intervening races 17, 17 rigidly in place.

The retaining ends 28, 28 have projections 37, 37.

These extend through transverse slots 38, 38 in the base 11. The retaining ends 28 are therefore anchored both top and bottom.

The bearing assembly thus constructed being of previously hardened parts, does not need to be further heat treated. The parts are assembled in such a way as to be interlocked and mutually braced against inadvertent distortion or loosening.

The bearing is fitted with its central cavity in the cap over a key or the like. The opposite sides of the series of bearing rollers are thus exposed to form an anti-friction bearing for slidable engagement with the complementary machine element.

While the preferred form of the invention has been illustrated and described by way of example, it will however be obvious that any changes can be made in minor details such as materials and proportions within the scope of the following claims.

What I claim is:

1. A recirculating reciprocating bearing of sheet metal for a key or the like, comprising a flat base with straight parallel side flanges, two straight parallel spaced races with curved abutting ends mounted on the base inwardly spaced from said side flanges, a cap fitted over the races and fastened to the base, roller return guides integral with the cap and in spaced relation around the ends of the races and a continuous series of rollers movably carried adjacent the said races.

2. A recirculating reciprocating bearing of sheet metal for a key or the like, comprising a flat base with straight parallel side flanges, two straight parallel spaced races with curved abutting ends mounted on the base inwardly spaced from said side flanges, a cap fitted over the races and keyed to the base, roller return guides integral with the cap and in spaced relation around the ends of the races and a continuous series of rollers movably carried adjacent the said races.

3. A recirculating reciprocating bearing of sheet metal for a key or the like, comprising a flat base with a raised central crown and straight parallel side flanges, two straight parallel spaced races with curved abutting ends mounted on the base around the crown, a cap fitted over the races and fastened to the base, roller return guides integral with the cap and in spaced relation around the ends of the races and a continuous series of rollers movably carried adjacent the said races.

4. A recirculating reciprocating bearing of sheet metal for a key or the like, comprising a flat base with straight parallel side flanges, two straight parallel spaced races with curved abutting ends mounted on the base inwardly spaced from said side flanges, a cap fitted over the races, tongues on the cap fixedly attached to the base inside the ends of the races, roller return guides integral with the cap and in spaced relation around the ends of the race and a continuous series of rollers movably carried adjacent the said races.

5. A recirculating reciprocating bearing of sheet metal for a key or the like, comprising a flat base with straight parallel side flanges, two straight parallel spaced races with curved abutting ends mounted on the base inwardly spaced from said side flanges, a cap fitted over the races, tongues on the cap fixedly attached to the base inside the ends of the races, roller return guides integral with the cap and in spaced relation around the ends of the races and secured to the base and a continuous series of rollers movably carried adjacent the said races.

6. A recirculating reciprocating bearing of sheet metal for a key or the like, comprising a flat base with straight parallel flanges, two straight parallel spaced races with curved abutting ends mounted on the base inwardly spaced from said side flanges, a cap fitted over the races and fastened to the base, said races having tongues interfitting the base and cap, roller return guides integral with the ends of the cap and in spaced arrangement around the ends of the races and a continuous series of rollers movably carried adjacent the said races.

7. A recirculating reciprocating bearing of sheet metal for a key or the like, comprising a flat base with straight parallel flanges, two straight parallel spaced races with curved abutting ends mounted on the base inwardly spaced from said side flanges, a cap fitted over the races and fastened to the base, said cap having depending side flanges, roller retainers integral with the ends of the cap and in spaced arrangement around the ends of the races and a continuous series of rollers with reduced ends movably carried in the space between the races and both the end retainers and the opposing flanges of the base and the cap.

8. A recirculating reciprocating bearing of sheet metal for a key or the like, comprising a flat base with straight parallel flanges, two straight parallel spaced races with curved abutting ends mounted on the base inwardly spaced from said side flanges, a cap fitted over the races and fastened to the base, roller return guides integral with the ends of the cap and in spaced arrangement around the ends of the race, inwardly curved wings on the retainers, and a continuous series of rollers movably carried adjacent the said races and within said wings.

References Cited in the file of this patent

UNITED STATES PATENTS 2,968,358     De Lorean _____ Jan. 17, 1961

FOREIGN PATENTS 1,193,830     France _____ May 4, 1959